(12) United States Patent
Forsberg et al.

(10) Patent No.: US 10,816,042 B2
(45) Date of Patent: Oct. 27, 2020

(54) COUPLING ARRANGEMENT FOR A GEARBOX

(71) Applicant: Scania CV AB, Södertälje (SE)

(72) Inventors: Jörgen Forsberg, Mariefred (SE); Elias Bartos, Huddinge (SE); Ninos Poli, Södertälje (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 16/094,200

(22) PCT Filed: Apr. 20, 2017

(86) PCT No.: PCT/SE2017/050387
§ 371 (c)(1),
(2) Date: Oct. 16, 2018

(87) PCT Pub. No.: WO2017/184067
PCT Pub. Date: Oct. 26, 2017

(65) Prior Publication Data
US 2019/0093712 A1    Mar. 28, 2019

(30) Foreign Application Priority Data

Apr. 21, 2016  (SE) ...................................... 1650534

(51) Int. Cl.
*F16D 11/10*       (2006.01)
*F16D 11/14*       (2006.01)
(Continued)

(52) U.S. Cl.
CPC .............. *F16D 11/14* (2013.01); *B60K 6/387* (2013.01); *F16D 11/10* (2013.01); *F16D 48/06* (2013.01);
(Continued)

(58) Field of Classification Search
CPC .......... F16D 11/14; F16D 66/00; F16D 11/10; F16D 48/06; F16D 2500/3026;
(Continued)

(56) References Cited

U.S. PATENT DOCUMENTS 4,699,235 A   10/1987  Anderson
6,008,606 A   12/1999  Arai et al.
(Continued)

FOREIGN PATENT DOCUMENTS

DE       10306641 A1    8/2004
DE    102006045732 A1    4/2008
(Continued)

OTHER PUBLICATIONS

Scania CV AB, International Application No. PCT/SE2017/050387, International Preliminary Report on Patentability, dated Oct. 23, 2018.
(Continued)

*Primary Examiner* — David J Hlavka
(74) *Attorney, Agent, or Firm* — Moore & Van Allen PLLC; W. Kevin Ransom

(57) ABSTRACT

The invention relates to a coupling arrangement for a gearbox, comprising a coupling sleeve, which is axially displaceable between a first and second position, a first and second rotatable element, which are connectable and disconnectable to each other by means of the coupling sleeve, an electrical machine connected to one of the first and second rotatable element, and a position indicator device for detecting the angular position of a rotor of the electrical machine. The position indicator device also is arranged to detect the axial position of the coupling sleeve.

22 Claims, 6 Drawing Sheets

(51) Int. Cl.
*F16D 66/00* (2006.01)
*F16D 48/06* (2006.01)
*B60K 6/387* (2007.10)
*F16D 11/00* (2006.01)

(52) U.S. Cl.
CPC .......... *F16D 66/00* (2013.01); *B60Y 2200/92* (2013.01); *F16D 2011/002* (2013.01); *F16D 2300/18* (2013.01); *F16D 2500/10412* (2013.01); *F16D 2500/1112* (2013.01); *F16D 2500/3026* (2013.01)

(58) Field of Classification Search
CPC ... F16D 2500/1112; F16D 2500/10412; F16D 2011/002; F16D 2300/18; F16D 2500/3021; F16D 2500/10462; F16D 23/02; F16D 11/00; F16D 2066/003; F16D 2066/008; B60K 6/387; B60K 6/547; B60K 2006/4825; B60K 6/48; B60K 6/40; F16H 2057/02043; B60Y 2200/92; G01D 5/12; G01P 3/36; G01P 3/42

See application file for complete search history.

(56) References Cited

U.S. PATENT DOCUMENTS

| | | | |
|---|---|---|---|
| 8,989,930 | B2 | 3/2015 | Sah et al. |
| 9,279,497 | B2* | 3/2016 | Keller .................. F16D 11/10 |
| 9,518,621 | B2 | 12/2016 | Andersson |
| 2001/0024996 | A1 | 9/2001 | Sugano |
| 2008/0022792 | A1 | 1/2008 | Robinson |
| 2008/0293542 | A1 | 11/2008 | Alfredsson et al. |
| 2012/0024652 | A1* | 2/2012 | Ishii .................... B60L 50/16 192/69 |
| 2012/0152049 | A1 | 6/2012 | Benson et al. |
| 2012/0255382 | A1* | 10/2012 | Richter ................ F16H 63/304 74/333 |
| 2013/0112522 | A1 | 5/2013 | Granzow et al. |
| 2013/0334001 | A1 | 12/2013 | Albrecht et al. |
| 2014/0162825 | A1* | 6/2014 | Sugimoto ............ B60K 6/48 475/149 |
| 2014/0329640 | A1 | 11/2014 | Helmer et al. |
| 2015/0226297 | A1* | 8/2015 | Knoblauch ......... B60L 15/2054 475/150 |
| 2015/0292571 | A1 | 10/2015 | Andersson |
| 2015/0354643 | A1* | 12/2015 | Ebuchi ................ F16D 48/064 192/69 |
| 2016/0003351 | A1* | 1/2016 | Park ...................... F16H 3/54 475/153 |
| 2016/0231198 | A1 | 8/2016 | Kaess et al. |
| 2017/0001627 | A1 | 1/2017 | Lindstrom et al. |
| 2017/0089429 | A1* | 3/2017 | Slapak .................. F16H 3/54 |
| 2017/0089437 | A1* | 3/2017 | Arnelof ............... F16H 37/046 |
| 2019/0093712 | A1 | 3/2019 | Forsberg et al. |

FOREIGN PATENT DOCUMENTS

| | | |
|---|---|---|
| DE | 102011080522 A1 | 2/2013 |
| DE | 102011085839 A1 | 5/2013 |
| DE | 102011119312 A1 | 5/2013 |
| DE | 102014204909 A1 | 9/2015 |
| EP | 566923 A1 | 10/1993 |
| EP | 1876422 A1 | 1/2008 |
| EP | 2500694 A2 | 9/2012 |
| EP | 2568192 A1 | 3/2013 |
| GB | 747400 A | 4/1956 |
| GB | 1345160 A | 1/1974 |
| JP | 2003202244 A | 7/2003 |
| JP | 2007114090 A | 5/2007 |
| JP | 2013243834 A | 12/2013 |
| SE | 1451654 A1 | 6/2015 |
| WO | 2007061348 A1 | 5/2007 |
| WO | 2007102762 A1 | 9/2007 |
| WO | 2013020734 A1 | 2/2013 |
| WO | 2013176107 A1 | 11/2013 |
| WO | 2014098657 A1 | 6/2014 |
| WO | 2015055339 A1 | 4/2015 |
| WO | 2015183159 A1 | 12/2015 |

OTHER PUBLICATIONS

Scania CV AB, European Application No. 17786253.9, Extended European Search Report, dated Dec. 19, 2019.
International Search Report for International Patent Application No. PCT/SE2017/050387 dated Jun. 19, 2017.
Written Opinion of the International Searching Authority for International Patent Application No. PCT/SE2017/050387 dated Jun. 19, 2017.
Swedish Office Action of International Patent Application No. 1650534-9 dated Nov. 14, 2016.

* cited by examiner

COUPLING ARRANGEMENT FOR A GEARBOX

CROSS-REFERENCE TO RELATED APPLICATION(S)

This application is a national stage application (filed under 35 § U.S.C. 371) of PCT/SE2017/050387, filed Apr. 20, 2017 of the same title, which, in turn claims priority to Swedish Application No. 1650534-9, filed Apr. 21, 2016 of the same title; the contents of each of which are hereby incorporated by reference.

FIELD OF THE INVENTION

The present invention relates to a coupling arrangement, a gearbox with such a coupling arrangement and a vehicle with such a gearbox according to the appended claims.

BACKGROUND OF THE INVENTION

Vehicles, and in particular heavy goods vehicles, e.g. trucks and buses, are usually equipped with a gearbox connected to a power source such as an internal combustion engine, an electric engine or a combination thereof. The gearbox may be automatic, manual or a combination thereof, which is provided with one or more actuating cylinders, which serves to shift gears in the gearbox. The actuating cylinders control the engagement and disengagement of gear wheels on different shafts in the gearbox, so that the appropriate gear is obtained. The actuating cylinders are of pneumatic, hydraulic or electric type and should be designed as small as possible due to the restricted space in the gearbox.

The transmission in trucks often comprises an automated manual transmission, which includes a large number of interacting components and which is controlled by an electronic control device to achieve automatic shifting of gears. One or more electronic sensors in the vehicle obtains information about the operating condition of the vehicle and provides signals to valves, which supply compressed air or hydraulic oil to the actuating cylinders, which thus control the engagement and disengagement of the gear wheels in the gearbox, so that shifting to appropriate gears are obtained.

In gearboxes of this type, the synchronization devices, comprising conical synchronization rings and coupling rings, may be replaced by coupling arrangements comprising toothed operating sleeves, which are displaced axially in order to engage with the gear wheels placed on input and main shafts in the gearbox. Each gear wheel placed on the input and main shafts is engaged with corresponding gear wheel elements, which are firmly attached to another shaft, such as a lay shaft. On shifting, the operating sleeve is displaced axially in order to engage with coupling teeth arranged on a selectable gear wheel, in order to connect the gear wheel to, and rotation lock it, on the input or main shaft.

The actuating cylinders of pneumatic or hydraulic type are connected to shifting forks via link members. When shifting gears the operating sleeve is displaced axially from a first position to a second position by means of the shifting fork. Detecting means arranged at the operating sleeve or at the actuating cylinder detects and indicates when the operating sleeve has reached the first and second position respective. However, such detecting means are expensive, increase the weight of the vehicle and contribute to separate components that may fail. In addition, due to the design and dimensions of the gearbox it can be difficult to arrange a detecting means at the operating sleeve or at the actuating cylinder.

If the vehicle is provided with an electric machine as a power source, it may be of a type, which is provided with a resolver for detecting the angular position of the rotor within the electric machine. The resolver comprises a resolver stator connected to a housing and a resolver rotor connected to the rotor of the electric machine. When the electric engine is provided with electrical power, the position of the rotor in relation to the stator of the electric engine is crucial in order to achieve torque from the electric engine and rotational movement of the rotor. The resolver can be likened to a small electric machine, where an alternating excitation signal creates an alternating feedback signal with different amplitude. This is achieved by means of primary, excitation windings in the resolver stator, a wave-formed resolver rotor of laminated steel, and secondary windings in the stator producing sine and cosine feedback signals.

The document EP2500694 discloses a resolver for a detecting the rotational or angular position of a shift select shaft with high accuracy, so that the shifting operation in the transmission can be performed with high accuracy. The resolver has an axial extension long enough, so that angular position of the shift select shaft may be detected regardless of which of selecting positions the shift select shaft is placed at.

SUMMARY OF THE INVENTION

There is a need to develop a coupling arrangement, which comprises few components, reduces the weight and increases reliability.

An object of the present invention is thus to provide a coupling arrangement, which comprises few components, reduces the weight and increases reliability.

The herein mentioned objects are achieved by a coupling arrangement, a gearbox with such a coupling arrangement and a vehicle with such a gearbox according to the independent claims.

According to an aspect of the invention the coupling arrangement for a gearbox, comprises a coupling sleeve, which is axially displaceable between a first and second position, a first and second rotatable element, which are connectable and disconnectable to each other by means of the coupling sleeve, an electrical machine connected to one of the first and second rotatable element, and a position indicator device for detecting the angular position of a rotor of the electrical machine. The invention is characterized in that the position indicator device also is arranged to detect the axial position of the coupling sleeve. Such a coupling arrangement comprises few components because the position indicator device for the electrical machine is also used for detecting the axial position of the coupling sleeve. Thus, there is no need of a separate position indicator device for detecting the position of the coupling sleeve. The weight of the coupling arrangement will also be reduced since no separate position indicator device is arranged for detecting the position of the coupling sleeve. Since no separate position indicator device is arranged for detecting the position of the coupling sleeve the number of components arranged for the coupling sleeve decreases and therefore the probability of failing components decreases, and thus the reliability of the coupling sleeve increases. The coupling sleeve is always connected to one of the first and second rotatable element which is also connected to the electrical machine.

According to a further aspect of the invention the position indicator device is a resolver comprising at least one resolver rotor arranged on the coupling sleeve. Using the resolver for the electrical machine as an axial position indicator and arranging the resolver rotor on the coupling sleeve, the position of the rotor of the electrical machine in the rotational direction may also be detected. This is possible when the electrical machine is connected to one of the first and second rotatable element.

According to a further aspect of the invention the at least one resolver rotor is arranged on an external periphery of the coupling sleeve. Depending on how the coupling sleeve and the electrical engine are connected, the arrangement of the resolver on the periphery of the coupling sleeve may be very convenient. Arranging the resolver rotor on the external periphery of the coupling sleeve is convenient when the diameter of the coupling sleeve is small.

According to a further aspect of the invention the at least one resolver rotor is arranged on an internal periphery of the coupling sleeve. Depending on how the coupling sleeve and the electrical engine are connected, the arrangement of the resolver on the periphery of the coupling sleeve may be very convenient. Arranging the at least one resolver rotor on an internal periphery of the coupling sleeve will lead to a very compact construction of the coupling sleeve.

According to a further aspect of the invention the resolver comprises a resolver stator, which has an axial extension substantially corresponding to an axial extension of the at least one resolver rotor. Having a substantially similar axial extension of the resolver stator and the resolver rotor a very precise detection of the movement and position of the resolver rotor in the axial direction is achieved.

According to a further aspect of the invention, the resolver comprises a primary and a secondary resolver rotor arranged on the coupling sleeve. Two resolver rotors increase the accuracy in detecting the axial movement and position of the coupling sleeve.

According to a further aspect of the invention the primary and secondary resolver rotor are made of different materials. When the coupling sleeve is displaced axially, the resolver stator will detect different feedback signals depending on the materials in the resolver rotors, and different signals are transmitted from the resolver depending on which signals are detected depending on the material in the resolver rotor. Thus, depending on the material in the resolver rotor, the axial position of the coupling sleeve may be determined.

According to a further aspect of the invention the primary and secondary resolver rotor have different designs in a plane having the normal parallel to an axis of the primary and secondary resolver rotors. Using a different designs or pattern of the resolver rotors, the resolver stator will detect different signals depending on the designs or patterns in the resolver rotors when the coupling sleeve is displaced axially. Different signals are transmitted from the resolver depending on the different designs or patterns in the resolver rotors. Depending on the design or pattern of the resolver rotor, which creates different signals which are detected by the resolver stator the axial position of the coupling sleeve is determined.

According to a further aspect of the invention the primary and secondary resolver rotor are separated from each other at a distance in the axial direction of the coupling sleeve and forming a gap between each other. When the coupling sleeve is displaced axially, the resolver stator will detect the gap between the resolver rotors. When detecting the gap a signal is transmitted from the resolver. Thus, the axial position of the coupling sleeve may be determined.

According to a further aspect of the invention, the resolver rotors may be arranged with different diameters. Depending on which rotor the resolver stator is adjacent, the signal from the resolver stator will be different due the difference in diameter of the resolver rotors.

According to a further aspect of the invention, it is possible to provide the resolver with two resolver stators and one resolver rotor. Two resolver stators increase the accuracy in detecting the axial movement and position of the coupling sleeve. The two resolver stators may be adapted to the features above, similar to providing the resolver with two resolver rotors.

According to a further aspect of the invention the resolver comprises one resolver rotor and one resolver stator, which resolver stator has an axial extension substantially corresponding at least twice the axial extension of the resolver rotor. When the coupling sleeve is displaced axially, the resolver stator will have contact with the resolver rotor during the entire axial displacement of the coupling sleeve. Thus, a continuous, but variable signal is transmitted by the resolver stator, which indicates the axial position of the coupling sleeve and also the angular position of the rotor of the electrical machine. When the resolver rotor is displaced to an area close to the centre of the resolver stator in the axial direction, the signal detected by the resolver stator will be different comparing to the situation when the resolver stator is displaced to an area at a distance from the centre of the resolver stator in the axial direction.

Further advantages of the invention appear from the following detailed description.

BRIEF DESCRIPTION OF THE DRAWINGS

Below is a description of, as examples, preferred embodiments of the invention with reference to the enclosed drawings, in which.

DETAILED DESCRIPTION OF THE INVENTION

Figure 1:
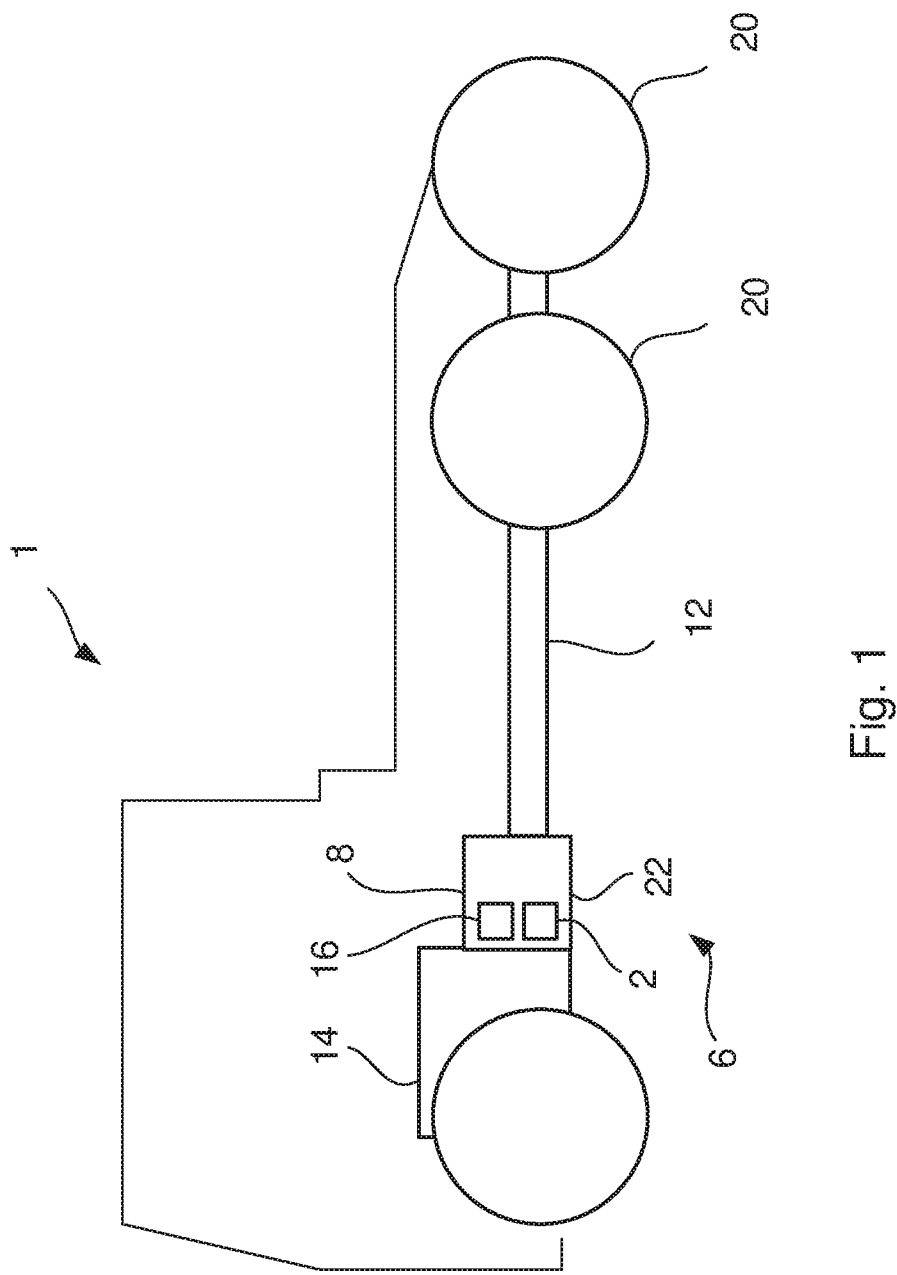
FIG. 1 schematically illustrates a vehicle provided with a coupling arrangement according to the invention.

FIG. 1 schematically illustrates a vehicle 1 provided with a coupling arrangement 2, 4 according to the invention. The vehicle 1 includes a powertrain 6, which comprises a power source 14, 16 a gearbox 8 and a propeller shaft 12. The power source 14, 16 is coupled to the gearbox 8, and comprises an internal combustion engine 14 or an electrical machine 16 or a combination thereof. The gearbox 8 is further connected to drive wheels 20 of the vehicle 1 via the propeller shaft 12. The gearbox 8 is surrounded by a gearbox housing 22.

Figure 2:
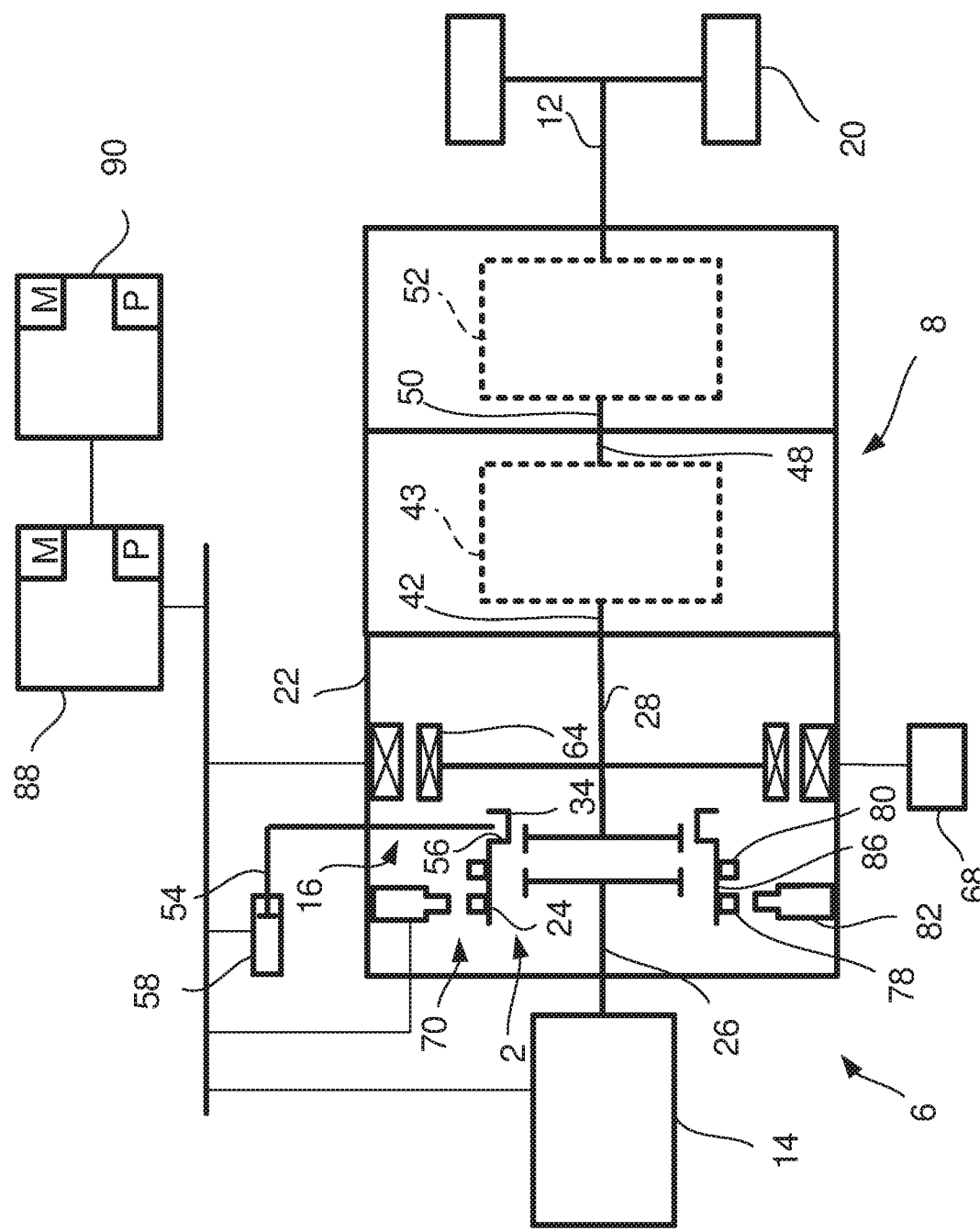
FIG. 2 shows a sectional view of a gearbox provided with a coupling arrangement according to the invention.

FIG. 2 shows a sectional view of the gearbox 8 provided with a coupling arrangement 2 according to the invention.

The internal combustion engine 14 is connected to the gearbox 8 via the coupling arrangement 2, which comprises an axially movable coupling sleeve 24. The axially movable coupling sleeve 24 is displaced axially in order to be brought into engagement with a first rotatable element 26, such as an output shaft 26 of the internal combustion engine 14 and a second rotatable element 28, such as an intermediate shaft 28 in the gearbox 8. The axially movable coupling sleeve 24 engages the output shaft 26 of the internal combustion engine 14 and the intermediate shaft 28 in the gearbox 8 by means of a splines connection 34. In a first axial position of the axially movable coupling sleeve 24, which is illustrated in FIG. 2, the output shaft 26 of the internal combustion engine 14 disengages from the intermediate shaft 28. In this first axially disengaged position, the axially movable coupling sleeve 24 is engaged only with the intermediate shaft 28 and will rotate together with the intermediate shaft 28 by means of the splines connection 34 between the axially movable coupling sleeve 24 and the intermediate shaft 28. In a second axial position of the axially movable coupling sleeve 24 the output shaft 26 of the internal combustion engine 14 and the intermediate shaft 28 are engaged by means of the first axially movable coupling sleeve 24.

The intermediate shaft 28 is connected to an input shaft of a main gearbox 43. An output shaft 48 of the main gearbox 43 is connected to an input shaft 50 of a range gearbox 52, which is schematically disclosed in FIG. 2. The range gearbox 52 is connected to the drive wheels 20 of the vehicle 1.

The axial displacement of the axially movable coupling sleeve 24 is provided with a shift fork 54 arranged in an outside circumferential groove 56 in the axially movable coupling sleeve 24. The shift fork 54 is influenced by a power means 58. The power means 58 may be a pneumatic, hydraulic or electric actuator.

An electrical machine 16 is arranged to rotate and brake the powertrain 6. A rotor 64 of the electrical machine 16 is connected to the intermediate shaft 28. The electrical machine 16 is also a power source for the vehicle 1. The electrical machine 16 may be designed to provide enough power and torque to the driving wheels 8 for propulsion of the vehicle 1 without using the internal combustion engine 14. Power to the electrical machine 16 may be provided from an energy storage 68 such as an electrochemical energy storage arranged in the vehicle 1 or from an external energy storage such as wires or other electrical conducting means (not disclosed) in the environment where the vehicle 1 is used. The energy storage 68 may also receive electrical power from the electrical machine 16 when the electrical machine 16 generates brake torque on the input shaft 42 of the main gearbox 43.

A position indicator device 70 is arranged for detecting the angular position of the rotor 64 of the electrical machine 16. The position indicator device 70 is also arranged to detect the axial position of the coupling sleeve 24. The position indicator device 70 is preferably a resolver 70 comprising at least one resolver rotor 78, 80 arranged on the coupling sleeve 24. Since the coupling sleeve 24, both in the first and second axial position, is in connection with the electrical machine 16 via the intermediate shaft 28, the coupling sleeve 24 will rotate when the rotor 64 of electrical machine 16 rotates. Thus, the resolver 70 may detect the angular position and speed of the rotor 64 of the electrical machine 16 both when the coupling sleeve 24 is in the first and the second axial position. The coupling sleeve 24 is always connected to one of the first and second rotatable element 26, 28, which is also connected to the electrical machine 16.

According to the embodiment in FIG. 2, the resolver comprises a primary and a secondary resolver rotor 78, 80 arranged on an external periphery of the coupling sleeve 24. Two resolver rotors 78, 80 will increase the accuracy in detecting the axial movement and position of the coupling sleeve 24. Arranging the resolver rotors 78, 80 on the external periphery of the coupling sleeve 24 may be very convenient, especially when the diameter of the coupling sleeve 24 is small. The resolver 70 also comprises a resolver stator 82 which, according to the embodiment show in FIG. 2, each has an axial extension substantially corresponding to an axial extension of the resolver rotor 78, 80. This may result in a very precise detection of the movement and position of the resolver rotor 78, 80 in the axial direction.

The primary and secondary resolver rotor 78, 80 may be made of different materials, so that when the coupling sleeve 24 is displaced axially, the resolver stator 82 will detect different feedback signals depending on the materials in the resolver rotors 78, 80. Thus, different signals are transmitted from the resolver depending on different material of the resolver rotor 78, 80. Therefore, the axial position of the coupling sleeve 24 may be determined.

As an alternative to different materials, or a combination thereof, the primary and secondary resolver rotor 78, 80 may have different designs in a plane having the normal parallel to an axis of the resolver rotors 78, 80. Using different designs or patterns of the resolver rotors 78, 80, the resolver stator 82 will detect different signals depending on the designs or patterns in the resolver rotors 78, 80 when the coupling sleeve 24 is displaced axially. Different signals are transmitted from the resolver 70 depending on the different designs or patterns in the resolver rotors 78, 80. Depending on the design or pattern of the resolver rotor 78, 80, which is detected by the resolver stator 82, the axial position of the coupling sleeve 24 is determined.

According to the embodiment shown in FIG. 2 the primary and secondary resolver rotor 78, 80 are separated from each other at a distance in the axial direction of the coupling sleeve 24 and forming a unit 86 between each other. When the coupling sleeve 24 is displaced axially, the resolver stator 82 will detect the gap 86 between the resolver rotors 78, 80. When detecting the gap 86 a signal is transmitted from the resolver 70. Thus, the axial position of the coupling sleeve 24 may be determined.

The resolver stator 82 has a circular configuration and radially embraces the primary and secondary resolver rotor 78, 80. The resolver stator 82 is attached to the gearbox housing 22.

An electronic control unit 88 is coupled to the gearbox 8, the internal combustion engine 14, the electrical machine 16 the resolver stator 82 and to the actuator. Preferably, a number of not shown speed sensors in the gearbox 8, and in the internal combustion engine 14 may be connected to the control unit 88. Another computer 90 may also be connected to the control unit 88. The control unit 88 may be a computer 90 with appropriate software for this purpose. The control unit 88 and/or the computer 90 comprise a computer program P, which can include routines to control the gearbox 8. The program P may be stored in an executable form or compressed form in a memory M and/or in a read/write memory. Preferably there is provided a computer program product comprising a program code stored on a, by a computer readable medium for performing gear shifting in the gearbox 8, when said program is run on the control unit 88 or another computer 90 connected to the control unit 88. Said code may be non-volatile, stored in said computer readable medium.

The signal from the resolver stator 82 may be compensated for the gap 86 between the primary and secondary resolver rotors 78, 80, so that the resolver 70 always detects the angular position of the rotor 64, 66 of the electrical machines 16 even though the resolver stator 82 passes the gap 86. Such compensation may be performed by means of the electronic control unit 88.

Figure 3A:
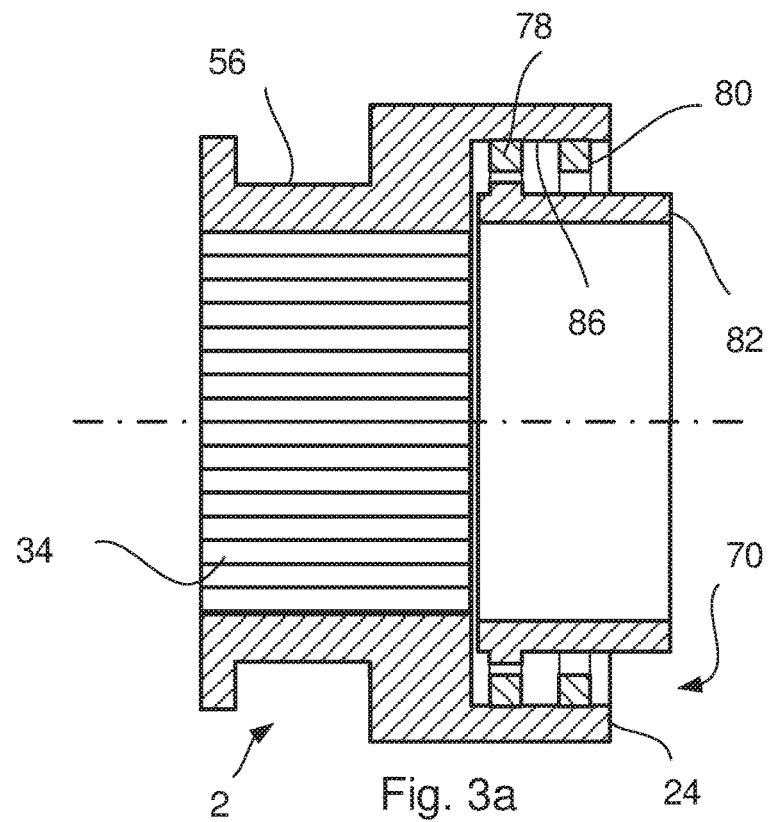
FIGS. 3a and 3b show sectional views of a second embodiment of a coupling arrangement in a first and second position according to the invention.
Figure 3B:
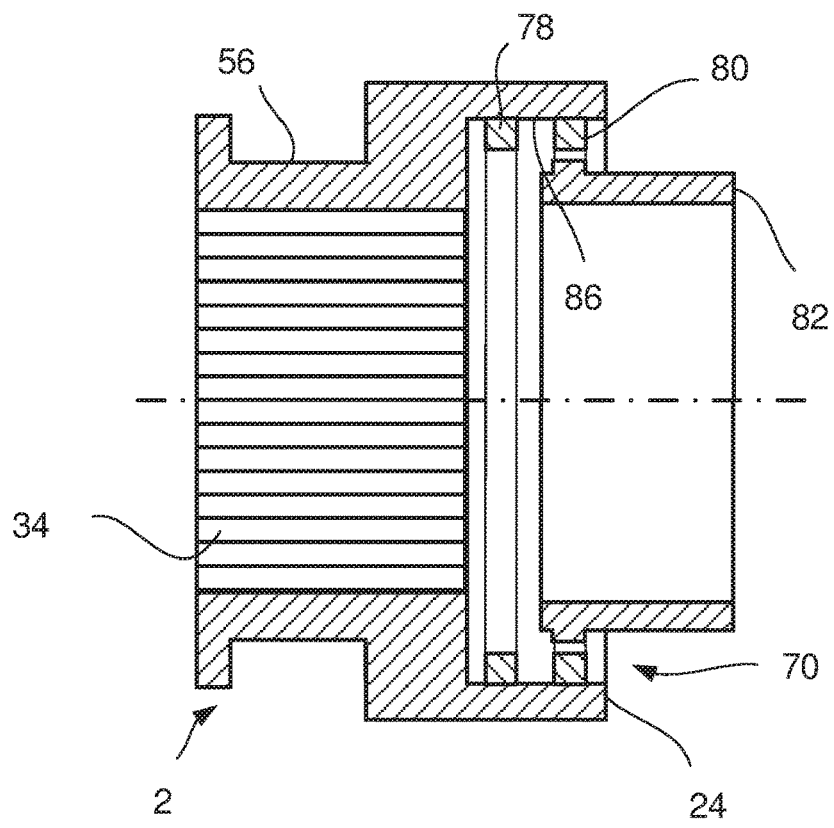

FIGS. 3a and 3b show sectional views of a second embodiment of the coupling arrangement 2. The primary and secondary resolver rotors 78, 80 are according to the second embodiment of the invention arranged on an internal periphery of the coupling sleeve 24. Arranging the resolver rotors 78, 80 on the internal periphery of the coupling sleeve 24 will lead to a very compact construction of the coupling arrangement 2, 4. The resolver stator 82 has a circular configuration and is radially embraced of the primary and secondary resolver rotor 78, 80. The resolver stator 82 is attached to the gearbox housing 22 or to a component, which is connected to the gearbox housing 22. In FIG. 3a, the coupling sleeve 24 is displaced into the first axial position, so that the resolver stator 82 detects the primary resolver rotor 78. In FIG. 3b, the coupling sleeve 24 is displaced into the second axial position, so that the resolver stator 82 detects the secondary resolver rotor 80. There is a gap 86 between primary and secondary resolver rotor 78, 80 and the resolver stator 82 has an axial extension, which substantially corresponds to the axial extension of the primary and secondary resolver rotor 78, 80, respective. The primary and secondary resolver rotor 78, 80 may be made of different materials. As an alternative to different materials, or a combination thereof, the primary and secondary resolver rotor 78, 80 may have different designs in a plane having the normal parallel to an axis of the resolver rotors 78, 80.

The resolver 70 can be likened to a small electric machine, where an alternating high frequency excitation signal creates an alternating feedback signal with different amplitude. This is achieved by means of primary, excitation windings (not disclosed) in the resolver stator 82, a wave formed resolver rotor 78, 80 of laminated steel, and secondary windings (not disclosed) in the resolver stator 82 producing sine and cosine feedback signals. The high frequency excitation signal, also called reference or carrier signal, is sent from an inverter (not disclosed) to the primary winding. Since the resolver rotor 78, 80 is wave shaped, the strength of excited magnetic field varies with resolver rotor 78, 80 position. The resolver rotor 78, 80 position can therefore be absolutely defined by the use of sine and cosine secondary windings. The sine and cosine values are uniquely defined for every angle of the 360° revolution.

Figures 4A, 4B:
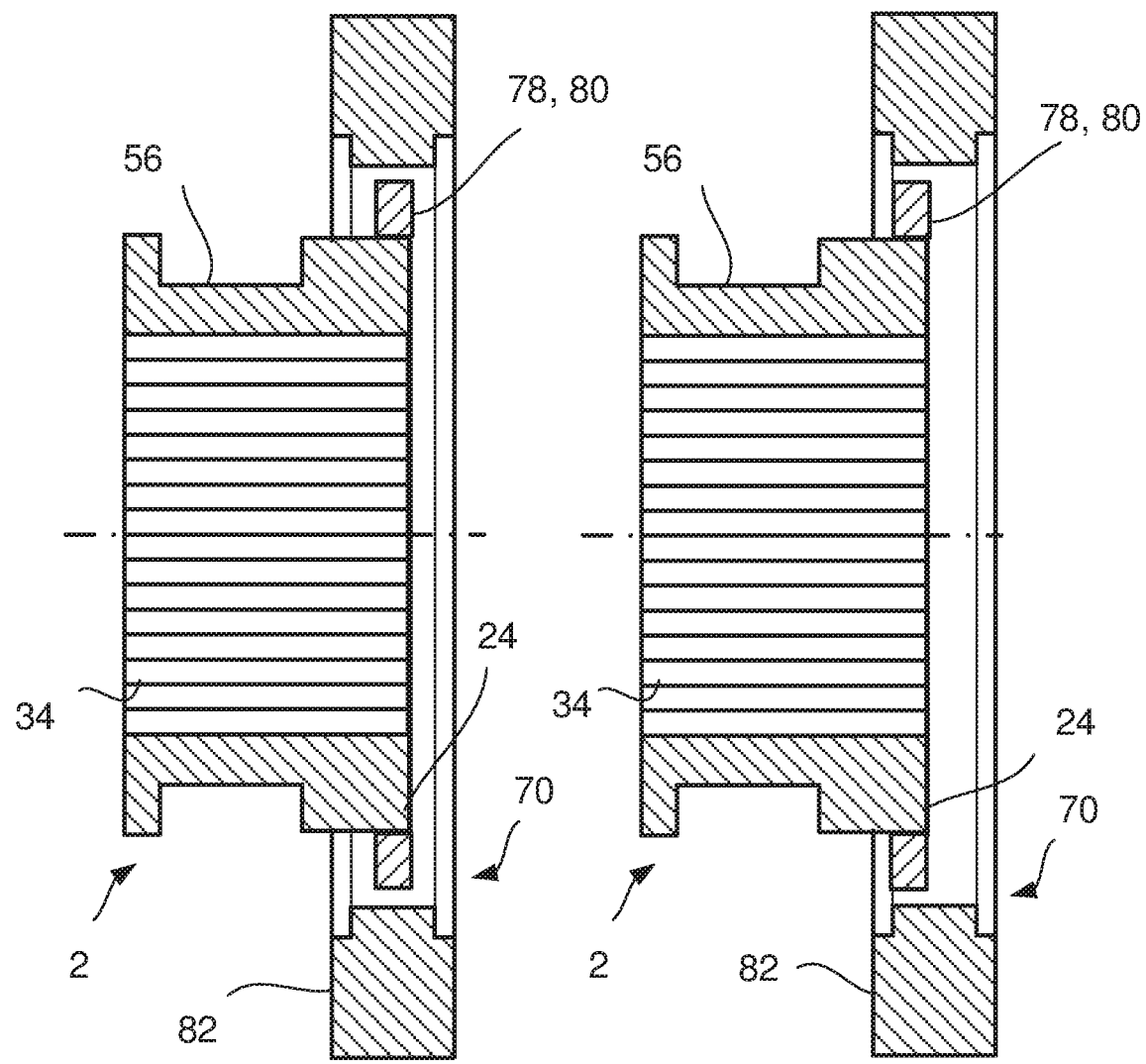
FIGS. 4a and 4b show sectional views of a third embodiment of a coupling arrangement in a first and second position according to the invention.

FIGS. 4a and 4b show sectional views of a third embodiment of the coupling arrangement 2, 4, in which the resolver 70 comprises one resolver rotor 78, 80 and one resolver stator 82, which resolver stator 82 has an axial extension substantially corresponding at least twice the axial extension of the resolver rotor 78, 80. When the coupling sleeve 24 is displaced axially, the resolver stator 82 will be in contact with the resolver rotor 78, 80 during the entire axial displacement of the coupling sleeve 24. Thus, a continuous, but variable signal is transmitted by the resolver stator 82, which indicates the axial position of the coupling sleeve 24 and also the angular position of the rotor 64, 66 of the electrical machine 16. The resolver stator 82 has a circular configuration and radially embraces the resolver rotor 78, 80. The resolver stator 82 is attached to the gearbox housing 22 or to a component, which is connected to the gearbox housing 22. In FIG. 4a, the coupling sleeve 24 is displaced into the first axial position and in FIG. 4b the coupling sleeve 24 is displaced into the second axial position. When the resolver rotor 78, 80 is displaced to an area close to the centre of the resolver stator 82 in the axial direction, i.e. FIG. 4a, the signal detected by the resolver stator 82 will be different comparing to the situation when the resolver stator 82 is displaced to an area at a distance from the centre of the resolver stator 82 in the axial direction, i.e. FIG. 4b. The resolver stator 82 may be made of different materials in the axial direction. As an alternative to different materials in the axial direction, or a combination thereof, the resolver stator 82 may have different designs in a plane having the normal parallel to an axis of the resolver stator 82.

Figure 5A:
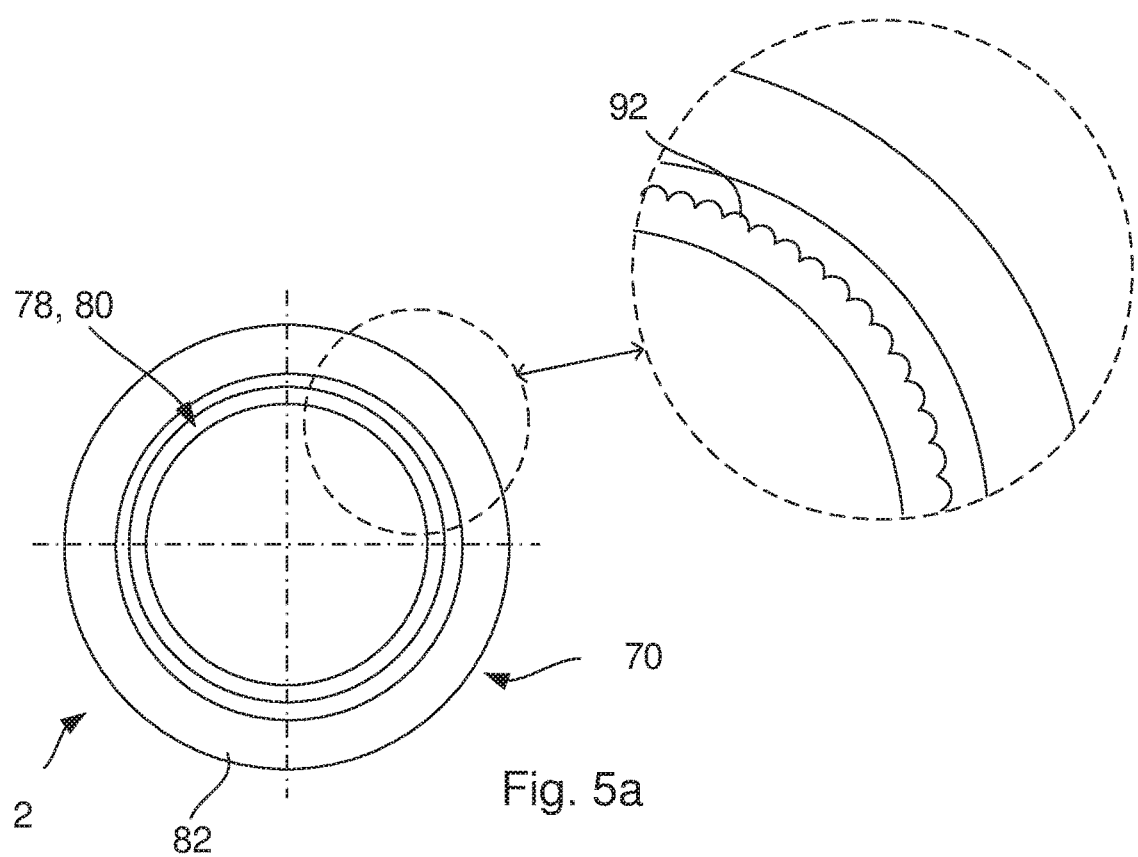
FIGS. 5a and 5b show side views in detail of resolvers having different designs.
Figure 5B:
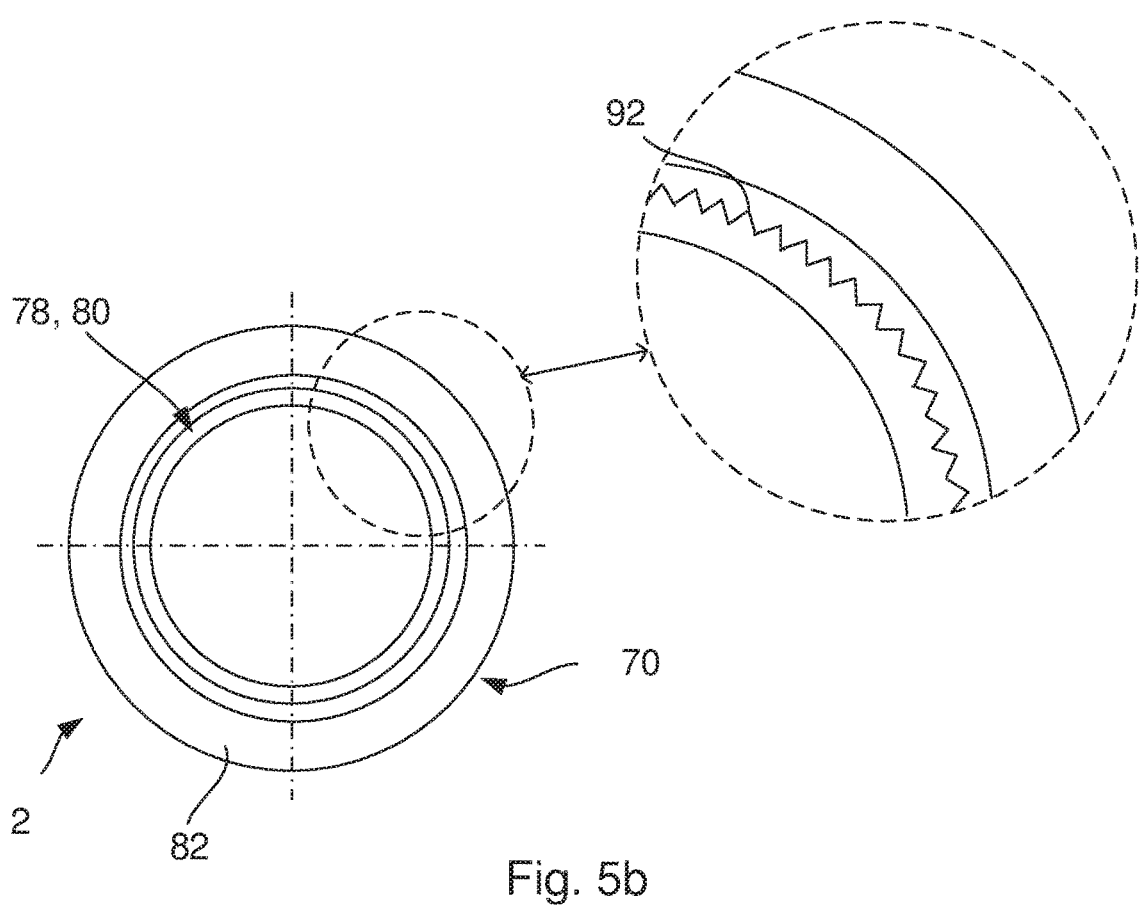

FIGS. 5a and 5b show side views in detail of resolvers 70 having different designs. In FIG. 5a the resolver rotor 78, 80 has a design of curved waves 92 on its periphery, which is shown in an enlarged detail in FIG. 5a. In FIG. 5b the resolver rotor 78, 80 has a design of sharp waves 94 on its periphery, which is shown in an enlarged detail in FIG. 5b. In both FIGS. 5a and 5b the resolver rotors 78, 80 and stators 82 has a circular shape, which are concentrically arranged in relation to each other. The resolvers 70 shown in FIGS. 5a and 5b may have all the characteristics of the embodiments described above. In addition to different designs of the resolver rotor 78, 80 it is also possible to provide the resolver rotor 78, 80 with different number of curved and sharp waves 94. In addition, it is possible to variate the axial and/or radial extension of the resolver rotor 78, 80 in the circumference direction, so that the thickness and/or width of the resolver rotor 78, 80 vary.

Figure 6:
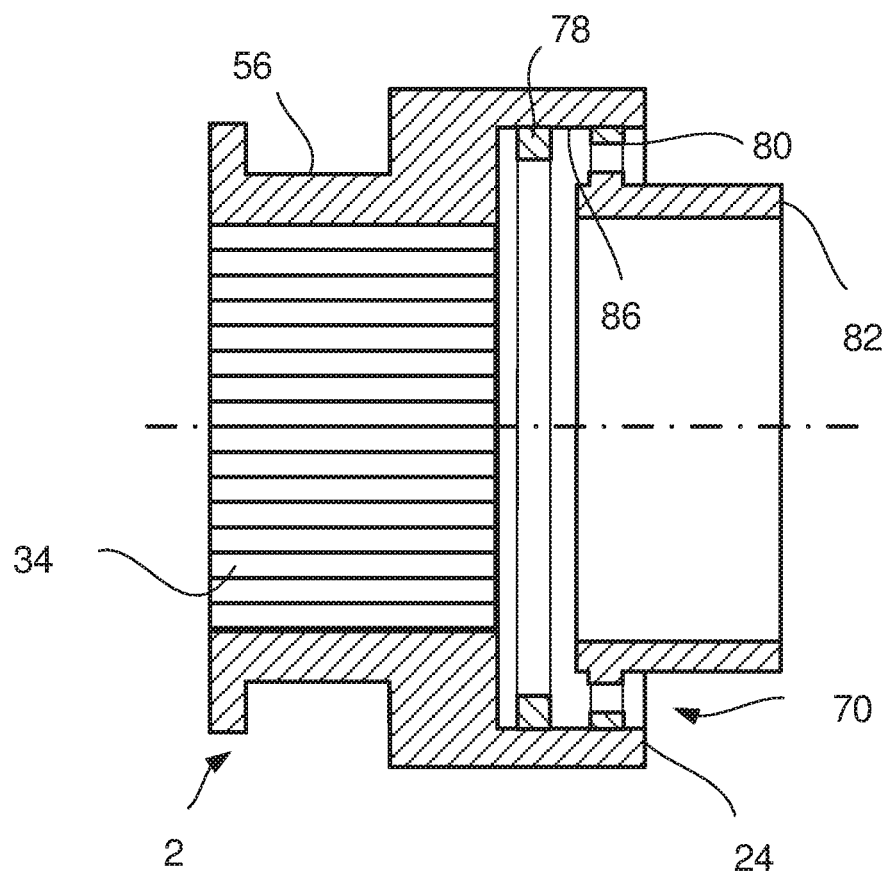
FIG. 6 shows a sectional view of a fourth embodiment of a coupling arrangement in a second position according to the invention.

FIG. 6 shows a sectional view of a fourth embodiment of a coupling arrangement in a second position according to the invention. Instead of, or in combination of providing the resolver rotors 78, 80 in different materials, it is also possible to design the resolver rotors 78, 80 with different diameters. Depending on which rotor 78, 80 the resolver stator 82 is adjacent, the signal from the resolver stator 82 will be different due the different in diameter of the resolver rotors 78, 80. Instead of arranging the inner diameter of one of the resolver rotors 78, 80 different, it is also possible to arranging the outer diameter different.

Instead of providing the resolver 70 with two resolver rotors 78, 80 and one resolver stator 82 it is also possible to provide the resolver 70 with two resolver stators and one resolver rotor. The stators may be arranged on an inner or outer periphery, with different materials and different designs as described above in regarding to two rotors.

The components and features specified above may within the framework of the invention be combined between the different embodiments specified.

The invention claimed is:
1. A coupling arrangement for a gearbox, comprising:
   a coupling sleeve, which is axially displaceable between a first and second position;
   a first and a second rotatable element, which are connectable and disconnectable to each other by means of the coupling sleeve;
   an electrical machine connected to one of the first or the second rotatable element; and
   a position indicator device for detecting an angular position of a rotor of the electrical machine, wherein the position indicator device also is arranged to detect an axial position of the coupling sleeve and in that the position indicator device is a resolver comprising a primary and a secondary resolver rotor arranged on the coupling sleeve.

2. The coupling arrangement according to claim 1, wherein the primary resolver rotor of the resolver is arranged on an external periphery of the coupling sleeve.

3. The coupling arrangement according to claim 1, wherein the secondary resolver rotor of the resolver is arranged on an internal periphery of the coupling sleeve.

4. The coupling arrangement according to claim 1, wherein the resolver comprises at least one resolver stator, which has an axial extension substantially corresponding to an axial extension of at least one of said primary or secondary resolver rotors.

5. The coupling arrangement according to claim 1, wherein the primary and secondary resolver rotors of the resolver are made of different materials.

6. The coupling arrangement according to claim 1, wherein the primary and secondary resolver of the resolver rotor have different designs in a plane having the normal parallel to an axis of the primary and secondary resolver rotors.

7. The coupling arrangement according to claim 1, wherein the primary and secondary resolver rotors of the resolver are separated from each other at a distance in the axial direction of the coupling sleeve and forming a gap between each other.

8. The coupling arrangement according to claim 1, wherein the resolver comprises a resolver stator, which resolver stator has an axial extension corresponding to at least twice an axial extension of the primary and secondary resolver rotors.

9. A gearbox comprising a coupling arrangement comprising:
a coupling sleeve, which is axially displaceable between a first and second position;
a first and a second rotatable element, which are connectable and disconnectable to each other by means of the coupling sleeve;
an electrical machine connected to one of the first or the second rotatable element; and
a position indicator device for detecting an angular position of a rotor of the electrical machine, wherein the position indicator device also is arranged to detect an axial position of the coupling sleeve and in that the position indicator device is a resolver comprising a primary and a secondary resolver rotor arranged on the coupling sleeve.

10. The gearbox according to claim 9, wherein the primary resolver rotor of the resolver is arranged on an external periphery of the coupling sleeve.

11. The gearbox according to claim 9, wherein the secondary resolver rotor of the resolver is arranged on an internal periphery of the coupling sleeve.

12. The gearbox according to claim 9, wherein the resolver comprises at least one resolver stator, which has an axial extension substantially corresponding to an axial extension of at least one of said primary or secondary the resolver rotors.

13. The gearbox according to claim 9, wherein the primary and secondary resolver of the resolver rotor are made of different materials.

14. The gearbox according to claim 9, wherein the primary and secondary resolver rotors of the resolver have different designs in a plane having the normal parallel to an axis of the primary and secondary resolver rotors.

15. A vehicle comprising a coupling arrangement comprising:
a coupling sleeve, which is axially displaceable between a first and second position;
a first and a second rotatable element, which are connectable and disconnectable to each other by means of the coupling sleeve;
an electrical machine connected to one of the first or the second rotatable element; and
a position indicator device for detecting an angular position of a rotor of the electrical machine, wherein the position indicator device also is arranged to detect an axial position of the coupling sleeve and in that the position indicator device is a resolver comprising a primary and a secondary resolver rotor arranged on the coupling sleeve.

16. The vehicle according to claim 15, wherein the primary resolver rotor of the resolver is arranged on an external periphery of the coupling sleeve.

17. The vehicle according to claim 15, wherein the secondary resolver rotor of the resolver is arranged on an internal periphery of the coupling sleeve.

18. The vehicle according to claim 15, wherein the resolver comprises at least one resolver stator, which has an axial extension substantially corresponding to an axial extension of at least one of said primary or secondary resolver rotors.

19. The vehicle according to claim 15, wherein the primary and secondary resolver of the resolver rotor are made of different materials.

20. The vehicle according to claim 15, wherein the primary and secondary resolver rotors of the resolver have different designs in a plane having the normal parallel to an axis of the primary and secondary resolver rotors.

21. The coupling arrangement according to claim 1, wherein the primary and secondary resolver rotors of the resolver are separated from each other at a distance in the axial direction of the coupling sleeve and form a gap between each other, wherein the resolver comprises at least one resolver stator adjacent said primary and secondary resolver rotors, wherein axial displacement of the coupling sleeve is detected by the resolver stator.

22. The coupling arrangement according to claim 1, the primary and secondary resolver rotors are made of different materials, wherein the resolver comprises at least one resolver stator adjacent said primary and secondary resolver rotors, wherein axial displacement of the coupling sleeve is detected by the resolver stator by detecting different feedback signals from the primary and secondary resolver rotors.

* * * * *

UNITED STATES PATENT AND TRADEMARK OFFICE
CERTIFICATE OF CORRECTION

| | |
|---|---|
| PATENT NO. | : 10,816,042 B2 |
| APPLICATION NO. | : 16/094200 |
| DATED | : October 27, 2020 |
| INVENTOR(S) | : Forsberg et al. |

It is certified that error appears in the above-identified patent and that said Letters Patent is hereby corrected as shown below:

In the Claims

In Column 9, Claim 6, please change Lines 19 through 22 to read:
"wherein the primary and secondary resolver rotors of the resolver have different designs in a plane having the normal parallel to an axis of the primary and secondary resolver rotors."

In Column 9, Claim 12, please change Lines 58 through 59 to read:
"extension of at least one of said primary or secondary resolver rotors."

In Column 10, Claim 13, please change Lines 1 through 3 to read:
"13. The gearbox according to claim 9, wherein the primary and secondary resolver rotors of the resolver are made of different materials."

In Column 10, Claim 19, please change Lines 35 through 37 to read:
"19. The vehicle according to claim 15, wherein the primary and secondary resolver rotors of the resolver are made of different materials."

Signed and Sealed this
Eighth Day of March, 2022

Drew Hirshfeld
*Performing the Functions and Duties of the
Under Secretary of Commerce for Intellectual Property and
Director of the United States Patent and Trademark Office*